KEY

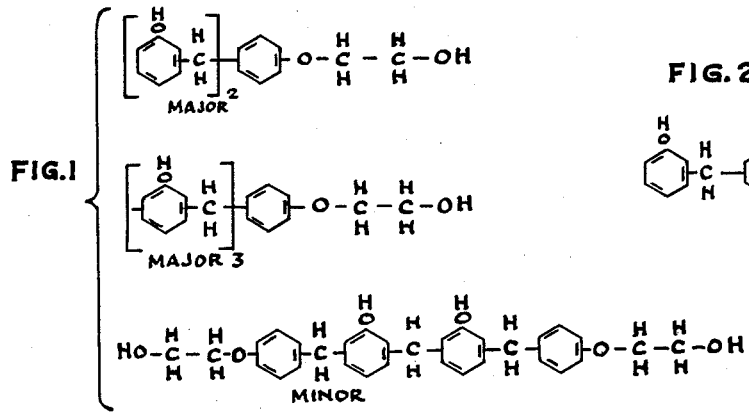
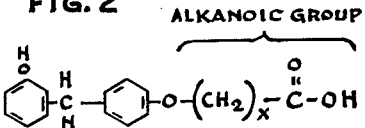
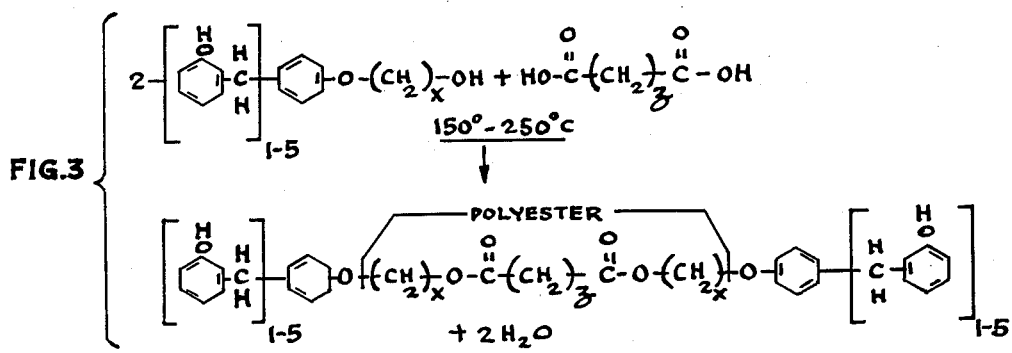
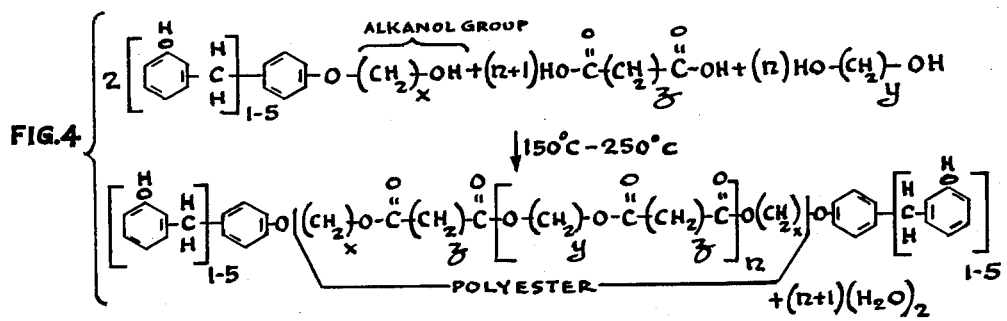

(n) = number of dicarboxylic acid units or diol units in polymer.

$[\ ]_n$ = number of polyester units necessary to give a polyester content of about 20% to 80% by wt.

$(CH_2)_x$ = 2-4 methylene groups between the phenolic oxygen and the first ester forming group, either alkanol or alkanoic.

$(CH_2)_y$ = 2-18 methylene groups between the -OH groups of the diol.

$(CH_2)_z$ = 2-22 methylene groups between the -COOH groups of the dicarboxylic acid.

Inventors
William D. Mecum
Frank W. Smith
Raymond E. Spokes

By Wallace and Cannon
Attorneys

United States Patent Office 3,061,579
Patented Oct. 30, 1962

3,061,579
COMPOSITION COMPRISING POLYESTER MODIFIED PHENOL-FORMALDEHYDE RESIN AND METHOD OF PREPARING SAME
William D. Mecum, Sloatsburg, N.Y., Frank W. Smith, Hackensack, N.J., and Raymond E. Spokes, Ann Arbor, Mich., assignors to American Brake Shoe Company, New York, N.Y., a corporation of Delaware
Filed June 4, 1957, Ser. No. 663,394
7 Claims. (Cl. 260—44)

This invention relates to resins and in particular to resins consisting of phenolic fragments joined by polyester linkages.

Phenolic resins are known for their hardness and heat resistance, and in many instances these characteristics are highly desirable. There are other instances, however, where it is desirable that such hardness be tempered somewhat and usually this is attained by an oil-modified phenolic, but the structure of oil-modified phenolics is difficult to control.

The primary object of the present invention is to form a phenolic resin which includes a polyester linkage, the polyester linkage serving to reduce the hardness or non-resilience of the phenolic per se so that the resin of the present invention possesses the desirable characteristics of the phenolic such as heat resistance together with the desirable characteristics of the polyester such as toughness. Another object of the present invention is to enable resins of the foregoing kind to be produced having a wide range of easily and selectively controlled characteristics attained principally by varying the length of the polyester chain between the phenolic fragments, but also somewhat by conversion of phenolic —OH groups to alkanol —OH groups.

Although most polyesters per se have less heat resistance than straight phenolics or even oil-modified phenolics, the resins of the present invention combine to a considerable extent the good heat resistance of the straight phenolics with elasticity, structural strength and adhesiveness of the polyester resins. They effect, in other words, a better compromise between the heat resistance of the phenolics and the structural advantages of the polyesters than do the commonly known oil-modified phenolics.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention.

In the drawings:

FIG. 1 is a group of structures illustrating some of those typically present in Example B hereunder;

FIG. 2 illustrates an alternative half ester derived from a phenolic fragment;

FIG. 3 is an equation for the minimum amount of ester modification where one alkanol group is attached to a phenolic resin fragment through a phenoxy link; and FIG. 4 illustrates an equation for a more highly ester modified phenolic resin where only one alkanol group is attached to a phenolic resin fragment through a phenoxy link and where diol and extra dicarboxylic acid are added.

Under the present invention, phenolic fragments containing an alkanol group $-(CH_2)_xOH$ or an alkanoic group $-(CH_2)_xCOOH$ as a monofunctional half ester group attached to the phenoxy position on the benzene ring by at least two methylene groups ($x$ in the immediate foregoing formulae is at least two) and including free or unmodified phenolic —OH groups on the benzene rings, are reacted with the complemental polyfunctional half ester to establish polyester linkages between the phenolic fragments. The complemental half ester in the most simple case will be a polycarboxy acid or a polyol as the case may be, or, as is preferable for increased polyester length, a combination of polycarboxy acid and polyol wherein the end groups (—COOH or —OH) are complementary to the half ester group on the phenolic. The length of the polyester chain and the degree of phenolic —OH substitution by an alkanol or an alkanoic group determines of course the degree to which the phenolic material is thus modified, and this degree of modification can be varied over a wide range. The polyester part of the resin can be varied almost endlessly by combining various polycarboxylic acids and polyols commercially available at reasonable cost. In most instances, it is sufficient to resort to a dicarboxy acid and diol. Phenolic fragments having one or more alkanol or alkanoic groups may be linked to afford polyester units by several alternate methods. Our preferred method consists of first esterfying the alkanol or alkanoic groups attached to the phenolic fragments with all of the dicarboxylic acid or diol required to give the proper modification. Complete esterification of these groups is rapidly accomplished where large excesses of diacid or diol is possible. The excess of diacid if present is then esterified with the proper amount of diol to as low an acid number as possible. The excess of diol if present is esterified with the proper amount of dicarboxylic acid. An alternate method is to preform a polyester fragment to required size and composition having terminal groups complementary to the ester forming groups attached to the phenolic fragments. The phenolic and polyester portions of the resin are then processed at from about 175° C. to 260° C. until the lowest possible acid number is obtained.

It is to be understood that it is not necessary for all of the phenolic resin fragments to be finally attached to polyester units since a reasonable number of free phenolic fragments are permissible and cannot be avoided when the ester content of the resin is as low as twenty percent. However, if cloud-free resins are desired, the non-modified phenolic resin content must be kept within limits. Phenolic fragments having attached alkanol groups improve the compatibility of non-modified phenolic fragments with the polyester modified phenolic portion.

In speaking of the ultimate degree of phenolic modification, the reference is the phenolic —OH groups on the phenolic fragments available for conversion to alkanol or alkanoic groups, such methylene containing side groups being half ester groups attached to the phenolic fragments at the open phenoxy position thus,

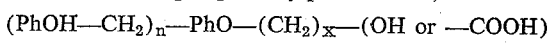

$(PhOH-CH_2)_n-PhO-(CH_2)_x-(OH \text{ or } -COOH)$

Two phenolic fragments thus substituted may then be completely esterified as will be explained in detail hereinafter to link the two fragments by a polyester chain. The smallest phenolic fragment will contain two phenol-aldehyde monomers, and therefore initially two phenolic —OH groups. In such case, only one of the phenolic —OH groups can be substituted by an alkanol or an alkanoic since if both were to be substituted the phenolic character of the resin would be destroyed. This fifty percent replacement of phenolic —OH groups is illustrated in FIG. 2 of the drawing and represents about the maximum that can be tolerated under the present invention. It is contemplated that each phenolic fragment can contain up to about six phenol monomers joined in the usual fashion by methylene groups (see FIG. 4). Regardless of size, the polymer should not contain more than two substituted phenolic —OH groups, and it will be appreciated that as a practical matter the phenolic fragments from the kettle will be a mixture of dimers, trimers and so on. Further in practice, the degree of polyester modification can vary from about twenty to eighty percent by weight of the final product. At the low modification level, the resin will have predominate phenol-aldehyde characteristics desirably tempered by polyester; at the higher modification level, the resin will have appreciable phenol-aldehyde characteristics but the polyester characteristics will predominate.

The end product can be cured and hardened with hexa (hexamethylenetetramine) for specific purposes.

The examples to be set forth hereinafter are of course specific in nature and the reactions are best followed with reference to the accompanying drawings.

*Example A.*—The product of Example A is an acid condensed phenolic resin intermediate prepared by the acid condensation of three to four molar parts of simple phenol with two to three molar parts of formaldehyde in the following manner:

Simple phenol, 13.3 pounds and 37 percent aqueous HCHO, 4.60 pounds were held at reflux in the presence of 0.05 pound of 20 percent $H_2SO_4$ in M.P. cresol for about 45 minutes until the HCHO in the reflux was about 2.7 percent. The pressure was then reduced and about 3.70 pounds of aqueous material was stripped off containing about 7.0 percent phenol and 0.80 percent HCHO. An additional 2.20 pounds of the above formaldehyde was added to the reaction product at 195° F. and refluxed for about 40 minutes at 216° F. The reaction mixture was then stripped to 310° F. and 45 mms. abs. pressure. The yield of light, clear, hard, brittle resin was about 12.00 pounds which was calculated to have a —$CH_2$— linkage content of about 1.15 pounds and a phenol content of about 10.85 pounds. This would correspond to about equal parts of trimeric and tetrameric conventional phenol-aldehyde resin structure. Of course some dimer and higher polymer are probably present but the product should be essentially free from monomeric phenol.

*Example B.*—To prepare the product of Example B, 12.00 pounds of Example A was left in the reactor and cooled to 280° F. A high-speed propeller-type agitator was adjusted so that the propeller blade was only about half immersed in the resin of Example A which was quite fluid at 280° F. At high speeds, this equipment breaks the resin up into droplets which present good contact area to gases. The system was next evacuated to about 25 mms. abs. pressure at which pressure 0.20 pound of triethylamine was added. Other tertiary amines can of course be used. The vacuum remaining in the reactor was quickly replaced with ethylene oxide and the propeller started. Absorption was fairly rapid with the pressure kept at 765–800 mms. abs. The ethylene oxide was fed into the system until 1.80 pounds were in at atmospheric pressure which required about 75 minutes. During this period the temperature rose from about 280° F. to about 320° F. The ethylene oxide was then absorbed to a pressure of about 200 mms. abs. and a $CO_2$ atmosphere substituted to atmospheric pressure. A stream of $CO_2$ was passed through the reactor for about 5 minutes to purge any remaining ethylene oxide. The product yield was about 13.76 pounds of a light colored, somewhat brittle, slightly tacky product which was quite hygroscopic. Chemically, about 35 percent of the phenolic —OH groups have been converted to B-phenoxy ethanol groups via ethylene oxide in a manner somewhat similar to that described in Patent No. 2,758,986. With an average of about 3.5 phenolic units per polymer molecule, the average alkenol content per molecule would be about 1.22 groups. Thus, on esterification of Example B either with dimer acids per se or dicarboxylic polyesters some trimeric molecules will be formed. Much of Example B will consist of the structures shown in FIG. 1 of the drawing.

It will be readily understood by those skilled in the art that other alkylene oxides can be substituted for ethylene oxide for forming an alkanol group on the phenolic molecule, and it is important only that the —OH constituent of the alkanol group be separated from the related benzene ring by at least two methylene groups. Such alkanol groups represent part of the polyester linkage to be completed by reaction with a polycarboxy acid as will be explained. Certain lactones may also be substituted for the ethylene oxide, and in such case will also represent part of the polyester linkage to be completed by reaction with a polyol material. The preferred lactone is propiolactone which adds on to the phenoxy position of the phenol thus, $PhO(CH_2)_2COOH$, resulting in an ester reactive alkanoic group separated from the phenoxy group by two methylene groups (see FIG. 2). It will also be understood that a certain amount of latitude is permissible in the percentage of phenolic —OH groups thus converted to alkanol or alkanoic half ester groups. What is desired is not less than one and not more than two such ester half groups per phenolic fragment regardless of its size. Two such groups on a dimer phenolic fragment is altogether objectionable since it destroys the phenolic character of the molecule so that it will not respond to a cure by hexa. More than two such groups on appreciable percentages of the larger fragments, even when they do not destroy the phenolic character, are objectionable since they result in branching or too much cross linking.

Example B (see FIG. 1) is a suitable intermediate for the construction of polyester modified phenolics (Examples 1–7). A polyester may be preformed, if desired, from a polycarboxy acid and a polyol so as to have two —COOH groups on the end of the polyester chain and then reacted with Example B to form the desired product or preferably, the polyester is formed by contacting all of the required dicarboxylic acid with the proper amount of Example B and heating until substantially all of the alkanol —OH groups on the phenolic have been converted to ester groups. These acid esters and the excess dicarboxylic acid, if any, are then processed with added diol or polyol until esterification of all carboxyls is substantially complete.

The poly or dicarboxylic acid used to form the polyester may be selected from a wide group including succinic, adipic, azelaic, sebacic, dimer fatty acids and other acids containing at least two —COOH groups. The polyols are preferably the glycols such as ethylene, 1,4-butanediol, 1,5-pentanediol and the like. However, in certain special instances as where a limited amount of branching and cross linking may be desirable, small amounts of polyols such as pentaerythritol may be used in conjunction with the diols. For high heat resistance combined with good elasticity or flexibility, it is desirable to avoid the isomeric or branched dicarboxylic acids or diols containing single hydrogens attached to carbon since these have been found to be generally inferior in the combined property of flexibility and good heat resistance.

If the symbol P is assigned to the phenol formaldehyde fragments containing from about 2–6 benzene rings joined by —$CH_2$— linkages and containing at least one alkanol —OH group and one phenolic —OH group (Example B) and the symbol E is assigned to the polyester units having two carboxyl groups, the general structure of the product of the present invention obtained from Example B may be most comprehensively set forth as follows:

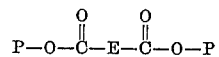

or

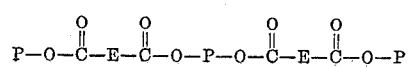

The chemical equation for the formation of these products obtained from Example B may be more specifically expressed as in FIG. 4 of the drawing wherein the polyester in the final product is about 20 to 80 weight percent of the final product.

POLYESTER MODIFIED PHENOLICS

The first five examples are resins in which the polyester content is about 63 percent and the phenolic content about 37 percent by weight of the product. Examples 6 and 7 are variations. The esterifications of Examples 1 to 6 are conducted in two steps and are equated in FIG. 4. First, all of the dicarboxylic acid is contacted with the alcoholized phenolic, Example B, to cause rapid and complete esterification of the alkanol groups. Next, all of the diol is added to carry out the second esterification step which comprises the joining together of the carboxylated phenolic with the excess free fatty acid required to give the correct polyester content. Physical properties of these resins may be found in the tables following Example 7.

In all examples the phenolic base, Example B, was heated to fluidity, about 240° F., before mixing with the dicarboxylic acid and the toluene. Water was separated and removed by a decanter system.

Example 1

This product was a polyester modified phenolic prepared from Example B, azelaic acid and 1,4-butanediol as shown below.

| | | |
|---|---|---|
| 260.0 gms. Example B | | I |
| 303.0 gms. azelaic acid | | II |
| 50.0 mls. toluene | | III |
| 135.0 gms. 1,4-butanediol | | IV |

In the first esterification step, I, II and III were refluxed for about 40 minutes at a temperature of 350–370° F. until a total of 13 mls. of aqueous takeoff had collected in the decanter. This was drawn off, IV was added and refluxing was continued for about 180 minutes at a temperature of 370° F.–470° F. until a total of 52 mls. of aqueous material had been removed from the system. The pressure was then reduced to about 28 mms. abs. and vacuum stripping was conducted for two hours from 480° F. to 535° F. at 27 mms. abs. The product was then cooled to 250° F. under vacuum and poured. The yield was 608 gms. of a very viscous, somewhat rubbery product. The total volatile products recovered from the reaction were 67 gms. of aqueous and 50 mls. of non-aqueous.

Example 2

This product is a polyester modified phenolic prepared from Example B, Empol polymer fatty acids and 1,4-butanediol as shown below.

| | | |
|---|---|---|
| 260.0 gms. Example B | | I |
| 355.0 gms. Empol polymer fatty acids | | II |
| 35.0 mls. toluene | | III |
| 27.0 gms. 1,4-butanediol | | IV |

In the first esterification step, I, II and III were refluxed for about 60 minutes at from about 380–480° F. until a total of 13.0 mls. of aqueous takeoff had collected in the decanter. This was drawn off, IV ws added and refluxing was continued for 105 minutes at a temperature of 430° F.–482° F. until a total of 20.5 mls. of aqueous material had been removed from the system. The pressure was then reduced to about 32 mms. abs. and vacuum stripping was conducted for 15 minutes at 32 mms. abs. at 420° F. The product was then cooled to 305° F. under vacuum. The vacuum was replaced with $CO_2$ and cooling was continued to 220° F. before pouring. The yield was 616 gms. of pale yellow, very viscous, somewhat rubbery resin. The total volatile products recovered from the reaction were 21.5 gms. of aqueous and 40 mls. of non-aqueous.

Example 3

This product is a polyester modified phenolic prepared from Example B, adipic acid and 1,4-butanediol as shown below.

| | | |
|---|---|---|
| 246.0 gms. Example B | | I |
| 267.0 gms. adipic acid | | II |
| 50.0 mls. toluene | | III |
| 156.0 gms. 1,4-butanediol | | IV |

In the first esterification step, I, II and III were refluxed for 40 minutes at from about 335° F. to 365° F. until 11.0 mls. of aqueous had collected in the decanter. This was drawn off, IV was added and refluxing continued for 150 minutes at from about 365° F. to 480° F. until a total of 72 mls. of aqueous material had been removed from the system. The pressure was then reduced to about 52 mms. and vacuum stripping was continued for 77 minutes to an end point of 38 mms. abs. at 500° F. The vacuum was replaced with $CO_2$ and the product cooled under $CO_2$ to 240° F. and poured. The yield was 577 gms. of pale, viscous rubbery resin. The total volatile recovered from the reaction were 73.0 gms. of aqueous and 52 mls. of non-aqueous.

Example 4

This product is a polyester modified phenolic prepared from Example B, azelaic acid and ethylene glycol as shown below.

| | | |
|---|---|---|
| 258.0 gms. Example B | | I |
| 332.0 gms. azelaic acid | | II |
| 40.0 mls. toluene | | III |
| 109.0 gms. ethylene glycol | | IV |

In the first esterification step, I, II and II were refluxed for 37 minutes at about 350° F.–420° F. until 14.0 mls. of aqueous had collected in the decanter. This was drawn off, IV was added and refluxing continued for 165 minutes at 420° F–466° F. until a total of 80 mls. of aqueous material had been removed from the system. The pressure was then reduced to 40 mms. abs. and vacuum stripping was continued for 70 minutes until the pot temperature was 425° F. at 40 mms. abs. The product was cooled under $CO_2$ and the yield was 604 gms. of a very viscous rubbery product. The total aqueous takeoff was 88 gms. and the total non-aqueous takeoff recovered was 36 mls.

Example 5

This product is a polyester modified phenolic prepared from Example B, azelaic acid and 1,5-pentanediol as shown below.

| | | |
|---|---|---|
| 258.0 gms. Example B | | I |
| 289.0 gms. azelaic acid | | II |
| 40.0 mls. toluene | | III |
| 140.0 gms. 1.5-pentanediol | | IV |

In the first esterification step, I, II and III were refluxed for 30 minutes at about 355° F.–430° F. until 13.5 mls. of aqueous material had collected in the decanter. This was drawn off, IV was added and refluxing was continued for 85 minutes at 430° F.–470° F. until a total of 57 mls. of aqueous material had been removed from the system. The pressure was then reduced to 38 mms. abs. and stripping was continued for 200 minutes from 470° F. to 533° F. at 28 mms. abs. This product was cooled under reduced pressure and poured. The yield was 608 gms. of a pale, rubbery, very tacky resin. The total volatile recovered from the reaction was 58.0 gms. of aqueous takeoff and 47 mls. of non-aqueous.

Example 6

This product is a polyester modified resin prepared from Example B, azelaic acid and ethylene glycol. It differs from Example 4 in that the polyester content has been reduced from 63 percent to about 40 percent.

| | |
|---|---|
| 780.0 gms. of Example B | I |
| 376.0 gms. of azelaic acid | II |
| 40.0 mls. toluene | III |
| 88.0 gms. ethylene glycol | IV |

In the first esterification step, I, II and III were refluxed for 71 minutes at 350° F.–428° F. until 36 mls. of aqueous material had been separated from the system. The glycol, IV, was added dropwise in about 50 minutes. Heating was continued for another 32 minutes at 440° F.–444° F. until 80 mls. of aqueous material had been removed from the system. The pressure was then reduced and stripping continued for 15 minutes until the pot temperature was 406° F. The vacuum was replaced with $CO_2$ and the product cooled under $CO_2$ to 300° F. before pouring. The yield was 1140 gms. of solid, non-tacky, rubbery resin. The total volatiles recovered from the reaction were 82.5 mls. of aqueous and 49 mls. of non-aqueous.

*Example 7*

This product is a polyester modified phenolic resin prepared from Example B, and azelaic acid alone. In other words, the reaction instead of proceeding in accordance with FIG. 4 proceeds as in FIG. 3 wherein no diol is used, thereby reducing the length of the polyester. The product represents about the minimum polyester content obtainable with a nine carbon dicarboxy acid and Example B. The polyester content is about 26.5 percent by weight, and its preparation follows:

| | |
|---|---|
| 786.0 gms. Example B | I |
| 188.0 gms. azelaic acid | II |
| 80.0 mls. toluene | III |

I, II and III were heated at reflux for about two hours at from about 340° F. to 462° F. until 36 mls. of aqueous had been removed from the system. The pressure was then reduced to about 35 mms. abs. and stripping was accomplished in 10 minutes from 462° F. down to 422° F. The vacuum was replaced with $CO_2$ and the product was cooled under $CO_2$ to 302° F. and poured. The yield was 921 gms. of product which was hard, tack-free and somewhat brittle when cold. The total recovered distillate was 36 mls. of aqueous and 73 mls. of non-aqueous.

All of the foregoing examples of resins are soluble in mixtures of aromatic hydrocarbons with ketones or esters. With 6 to 8 percent of added hexamethylenetetramine, they can be cured rapidly at temperatures of 280° F.–320° F. These hexa cured products are tough and elastic for Examples 1–5 inclusive, and horny and somewhat brittle for Examples 6–7 inclusive.

The cured products are suitable as bonds for heat resistant, laminated structural products, brake lining and the like. The excellent bonding properties of these resins are similar to the conventional polyesters which are cured by vinyl polymerization. However, the phenolic components and the absence of any

type of linkages result in much superior heat resistance for the same degree of elasticity. In most of these resins there remains a substantial residue from the polyester portion on heating to 900° F. In most oil-modified phenolics the triglyceride residue is nil.

The uncured products also exhibit good adhesive characteristics. An uncured resin having a 33 percent polyester content, for instance, shows excellent adhesion to polished chrome plate.

Tables I, II, III and IV list the comparative physical properties of these examples as compared with a 63 percent oil-modified phenolic resin, designated herein as 31B6. All data are on films cured with 6.5 percent hexamethylenetetramine and cast to a thickness of 0.040".

TABLE I

| Example No. | Tensile (pounds) | | Elongation | | Compressibility (percent) | |
|---|---|---|---|---|---|---|
| | Std. Cure [1] | +2 hours 450° F. | Std. Cure [1] | +2 hours 450° F. | Std. Cure [1] | +2 hours 450° F. |
| 1 | 484 | 724 | 40 | 15 | 30.6 | 16.4 |
| 2 | 848 | 910 | 0 | 5 | 13.2 | 9.6 |
| 3 | 445 | 710 | 30 | 10 | 32.0 | 15.6 |
| 4 | 808 | 914 | 45 | 0 | 25.0 | 11.8 |
| 5 | 369 | 600 | 50 | 10 | 35.3 | 18.6 |
| 6 | 2,000+ | | | | | |
| 7 | 2,000+ | | | | | |
| 31B6 | 323 | 666 | 40 | 0 | 30.3 | 11.2 |

[1] Standard cure = 6–8 percent hexa at 280–320° F.

The following table lists thermal data obtained by heating 30 mesh, 300 mg. samples of the resins in a Vycor tube in a Mikro combustion furnace. The samples were heated consecutively for 10 minutes at 300–500° F., 500–600° F., 600–700° F., 700–800° F. and 800–900° F. Results are listed for both the normally cured product and the product heat aged for 2 hours at 450° F.

TABLE II

| Examples | | Percent | | |
|---|---|---|---|---|
| | | Gas | Liquid | Residue |
| 1 | Standard Cure | 17.91 | 43.46 | 38.63 |
| | Heat Age | 18.12 | 35.56 | 46.32 |
| 2 | Standard Cure | 11.19 | 51.98 | 36.83 |
| | Heat Age | 12.20 | 49.31 | 38.49 |
| 3 | Standard Cure | 21.40 | 39.75 | 38.85 |
| | Heat Age | 20.27 | 39.74 | 39.99 |
| 4 | Standard Cure | 19.52 | 38.84 | 41.64 |
| | Heat Age | 21.20 | 22.22 | 56.58 |
| 5 | Standard Cure | 16.65 | 37.09 | 46.26 |
| | Heat Age | 17.77 | 4.34 | 40.89 |
| 6 | Standard Cure | 12.62 | 32.73 | 54.65 |
| | Heat Age | 12.73 | 30.63 | 56.64 |
| 7 | Standard Cure | 10.18 | 26.95 | 62.87 |
| | Heat Age | 10.62 | 23.70 | 65.68 |
| 31B6 | Standard Cure | 12.61 | 58.43 | 28.96 |
| | Heat Age | 15.54 | 51.93 | 32.53 |

TABLE III.—VOLATILES

| Example | Cure Loss, percent | One Hour at Following Temps. | | |
|---|---|---|---|---|
| | | 500° F., percent | 600° F., percent | 700° F., percent |
| 1 | 7.70 | 4.05 | 11.85 | 24.30 |
| 2 | 3.10 | 3.54 | 5.45 | 14.33 |
| 3 | 3.10 | 4.68 | 14.45 | 41.20 |
| 4 | 4.80 | 6.13 | 16.20 | 23.45 |
| 5 | 5.30 | 3.29 | 8.88 | 24.75 |
| 6 | | 6.63 | 9.12 | 17.80 |
| 7 | | 4.70 | 6.40 | 14.50 |
| 31B6 | | 5.58 | 5.67 | 21.20 |

TABLE IV.—ACETONE EXTRACTS

| Example | No Heat, percent | After Heating One Hour at Temps. | | |
|---|---|---|---|---|
| | | 500° F., percent | 600° F., percent | 700° F., percent |
| 1 | 21.00 | 11.40 | 8.76 | 7.95 |
| 2 | 13.80 | 7.20 | 8.38 | 16.80 |
| 3 | 21.00 | 12.10 | 8.27 | 8.60 |
| 4 | 22.00 | 8.70 | 3.81 | 9.45 |
| 5 | 22.00 | 12.40 | 12.22 | 8.12 |
| 6 | 11.00 | 3.45 | 2.25 | 7.00 |
| 7 | 7.20 | 3.35 | 3.30 | 6.70 |
| 31B6 | 22.00 | 8.20 | 9.00 | 16.60 |

The resin of the present invention may be produced by commencing with phenolic fragments modified at —OH positions by alkanoic groups, FIG. 2, which are then linked by a polyol. Example 8 is of this order.

Example 8

This product is a polyester modified resin prepared from an acid condensed phenolic resin such as Example A, B-propiolactone, 1,4-butanediol and azelaic acid as shown below.

| | |
|---|---|
| 431.0 gms. phenolic resin like Example A | I |
| 6.0 gms. N (C$_2$H$_5$)$_3$ (catalyst) | II |
| 120.0 gms. B-propiolactone | III |
| 272.0 gms. 1,4-butanediol | IV |
| 50.0 mls. toluene | V |
| 453.0 gms. azelaic acid | VI |

In the first preparation step, I was heated to a fluid condition, 260° F., and II was added dropwise with heat off. Six minutes later the temperature was 241° F. At this point, with heat off, III was added dropwise over a period of 16 minutes. The exothermic reaction carried the temperature to 316° F. The crude product was held for 33 minutes at 316° F.–330° F. and then stripped under reduced pressure to 30 mms. abs. at 326° F. After cooling to 305° F., all of V and 150.0 gms. of IV were added and the temperature raised to 402° F. in about 85 minutes. The aqueous take-off was separated from the toluene in a decanter and removed. Toluene was kept at all times under vigorous reflux. The rest of IV and all of VI was next added and esterification was continued for 5.5 hours at 370°–426° F. at which time the total aqueous take-off was 124 mls. The remaining product in the flask was vacuum stripped to 30 mms. abs. at 428° F. and then held for about 5.0 hours at 28–30 mms. abs. at a temperature of 430–460° F. The vacuum was then replaced with CO$_2$ and the product cooled to 220° F. before pouring from the flask. The yield was 1075 gms. of a pale yellow, very viscous sticky resin. With 6–8% of added hexa, it cures rapidly at 320° F. to a tough somewhat rubbery non-tacky product. It is suitable as a bond in friction elements, adhesives, laminates and the like.

It is preferred that but a single —OH group on a phenolic fragment be converted to an alkanoic or an alkanol ester half group, but in the larger phenolic fragments it is possible to convert up to about fifty percent of the phenolic —OH groups. In such a circumstance, the phenolic fragment will behave as a diacid or a diol and may itself become part of the polyester chain. Example 9 below is of this order and is within the purview of the invention.

Example 9

This product is a polyester modified phenolic resin prepared from an acid condensed phenolic resin such as Example A, ethylene oxide, azelaic acid and 1,4-butanediol. Excess and stripable —OH groups are provided in the form of ethylene glycol. In this resin about half of the phenolic —OH groups are converted to phenoxy ethanol groups so that many of the phenolic fragments behave as diols and as such replace an equivalent amount of 1,4-butanediol.

| | |
|---|---|
| 10.95 lbs. phenolic resin (Example A) | I |
| 85 gms. N.(C$_2$H$_5$)$_3$ | II |
| 2.20 lbs. ethylene oxide | III |
| 13.70 lbs. azelaic acid | IV |
| 1.50 lbs. toluene | V |
| 4.33 lbs. 1,4-butanediol<br>.60 lbs. ethylene glycol—excess —OH | VI |
| 1.50 lbs aromatic naphtha<br>1.50 lbs. diacetone alcohol | VII |

In this process, I was held in a five-gallon stainless steel process kettle at 270–280° F. and 20 mms. of Hg abs. The catalyst, II was next introduced and the pressure immediately brought to 750–800 mms. abs. with III. The high-speed agitator was set to just break the surface and provide a blast of fine resin droplets above the surface. The temperature was allowed to rise exothermically to 328° F. The pressure was maintained at 750–800 mms. until all of III was in which required about an hour. The ethylene oxide atmosphere was then absorbed and reacted until there was no further pressure drop, about 65 mms. abs. Next IV and V were added. Esterification was conducted at about 330–420° F. until about 0.91 lbs. of aqueous product was collected. Next VI was added and esterification was conducted at about 330–405° F. until about 2.30 lbs. of aqueous product from both esterification steps had been separated in the decanter system. This aqueous layer consisted mostly of water with some glycol. Pressure was next reduced and toluene, some glycol and a little water was stripped from the system. Body developed rapidly and in 27 minutes at 400° F.–405° F. the viscosity rose from 1.25 poises to 6.00 poises. At this point the pressure was 20 mms. abs. and the temperature 405° F. The vacuum was replaced by CO$_2$ and the resin cooled to 321° F. at which point VII was added and well mixed. The yield was 30.80 lbs. out of the kettle and at room temperature the approximately 90% solids solution was pale yellow and quite rubbery. The viscosity was found to be 23,400 poises at 77° F. This product responds slowly to a cure by hexamethylenetetramine. The cured products are tough, somewhat leathery and have an elongation of about 85%. This product is suitable for use in brake lining, flexible adhesives and laminates, as are all of the foregoing embodiments.

In the practice of the present invention therefore, we preferably react alkylene oxides with phenol-aldehyde fragments to produce alkanol groups at phenoxy positions which can be esterified with polycarboxy acids with or without added poly or diols, or we can react a lactone such as propiolactone to attach a propionic acid group

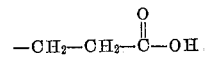

to the phenolic fragment which can then be esterified with poly or diols with or without poly or dicarboxy acids. The latter type of resin is, however, somewhat less satisfactory on a yield basis because the lactone itself tends to form an ester which distills out of the system.

The simplest product possible under the present invention is one where one mole of dicarboxy acid links two alcoholized phenolic fragments as shown in FIG. 3 or, alternatively, where one mole of diol links two carboxylated phenolic fragments of the type represented in FIG. 2. Beyond this, the phenolic content of the resin may be reduced by using, for example, two molar parts of acid to one of diol, three molar parts of acid to two of diol and so on.

Cross linking should be avoided in the resins of the present invention if this is likely to reach the stage where the phenolic character of the resin is likely to be lost for standard curing purposes by hexa or the like. As a safety measure, therefore, the reactions should be carried out so that there are not more than two alkanol groups or the equivalent alkanoic groups per phenolic fragment as shown in FIG. 1 of the drawing, otherwise gelation will very likely occur during final esterification rendering the reaction impractical, and preferably as a safety measure the reactions should be carried out so that on an average there will be about 1.2 such groups per phenolic fragment.

It was mentioned that the ester half groups attached to the phenol fragments at the phenoxy positions should include at least two methylene groups. In other words, for the best heat resistance the terminal carboxylates —COO— on the polyester are linked to the phenolic fragments by at least two terminal methylene groups of the polyester at each end thereof. This limitation does not prevail in respect of the methylene groups in the polycarboxy acid or polyalcohol to be reacted with the phenolic fragments, and these may contain from two to about twenty-two for the poly or dicarboxylic acid and from two to about eighteen for the diol or the polyol.

In the practice of our invention, we prefer to use glycols with primary —OH groups and without branching of the hydrocarbon chain separating the hydroxyl groups. It can be readily seen that polyols containing more than two hydroxyl groups will result in early cross linking and gelation and should be avoided except where it is desirable to effect curing by a degree of further esterification rather than complete cure only through the phenolic —OH groups. If such extended esterification cure is sought, a polyalcohol such as glycerine or pentaerythritol may be added to replace part of the selected diol. It will be found preferable to add the triol after initial linking of the phenol fragments by initial esterification with the diol has been completed, and then to only partially esterify the polyalcohol. Esterification for cure can be completed in the end use product.

The resins of the present invention can therefore be made to exhibit a wide variety of physical properties such as tensile, elongation, heat resistance and compressibility. Their structure can be more easily controlled than that of oil-modified phenolics. The higher polyester modifications (fifty percent and upwards) are very rubbery before a hexa cure, but less so than GRS. Fifty percent solutions in aromatic hydrocarbons can be readily handled. For convenience in the claims, the phenyl group shown in conventional benzene ring form in the drawings will be replaced by the standard symbol, pH, and other conventional symbols will likewise be used or defined.

Hence, while we have illustrated and described preferred embodiments of our invention it is to be understood that these are capable of variation and modification.

We claim:

1. A polyester modified phenol-formaldehyde resin comprising at least a pair of phenol-formaldehyde polymer fragments having free phenolic —OH groups and unsubstituted reactive hydrogen on the phenolic nuclei, and said fragments each having attached at phenoxy positions thereof a group selected from the group consisting of alkanol and alkanoic groups which contain at least two methylene groups attached directly to said phenoxy attached positions, said groups being joined together by polyesterification with the complemental difunctional group selected from the group consisting of saturated unbranched dicarboxy acid, saturated unbranched diol and a polyester combination thereof to thereby complete a polyester chain between the phenoxy positions of the phenolic fragments, said polyester chain representing between about twenty and about eighty precent by weight of the resin, said fragments in the resin being on average about 3.5 phenolic nuclei in length each containing on average about 1.22 of the phenoxy-attached groups so that less than fifty percent of the phenolic —OH groups are replaced by said phenoxy-attached groups.

2. A method of preparing a polyester modified phenol-formaldehyde resin comprising, replacing less than all of the phenolic —OH content in at least a pair of phenol-formaldehyde resin fragments on average about 3.5 phenolic nuclei in length, each containing at least two and up to six monomers and having unsubstituted reactive hydrogen on the phenolic nuclei, with a monofunctional group attached to said fragments at phenoxy positions thereof and selected from the group consisting of alkanol and alkanoic monofunctional groups and containing at least two methylene groups attached directly to said phenoxy positions, said replacement being made to the extent that there are on average about 1.22 of said monofunctional groups per phenolic fragment so that in each such fragment less than fifty percent of the phenlic —OH content is replaced, and then esterifying the phenoxy attached groups with the polyfunctional complemental group selected from the group consisting of saturated unbranched dicarboxy acid, saturated unbranched diol and a polyester combination thereof to join said fragments through a polyester chain, said polyester chain representing about twenty to eighty percent by weight of the modified resin product.

3. A method of preparing a polyester modified phenol-formaldehyde resin comprising, oxyalkylating less than about fifty percent of the phenolic —OH content in a pair of phenol-formaldehyde resin fragments, on average about 3.5 phenolic nuclei in length, with an alkylene oxide to attach on average about 1.22 alkanol groups individually to said fragments at phenoxy positions thereof while retaining unsubstituted reactive hydrogen on the phenolic nuclei, and then esterifying said alkanol groups with a saturated unbranched dicarboxy acid selected from the group consisting of succinic, adipic, azelaic and sebacic acid.

4. A polyester modified phenol-formaldehyde resin comprising at least a pair of phenol-formaldehyde polymer fragments having free phenolic —OH groups and unsubstituted reactive hydrogen on the phenolic nuclei, and said fragments each having attached at phenoxy positions thereof a group selected from the group consisting of alkanol and alkanoic groups which contain at least two methylene groups attached directly to said phenoxy positions, said phenoxy attached groups being joined together by polyesterification with the complemental difunctional polyester group to thereby complete a polyester chain between the phenoxy positions of the phenolic fragments, said polyester chain representing between about twenty and about eighty percent by weight of the resin, said fragments in the resin being on average about 3.5 phenolic nuclei in length each containing on average about 1.22 of the phenoxy-attached groups so that less than fifty percent of the phenolic —OH groups are replaced by the phenoxy-attached groups.

5. A hexamethylenetetramine curable esterification phenolic-polyester product consisting only of: (1) an oxyalkylation product of an alkylene oxide and unsubstituted trifunctional phenol-formaldehyde resin fragments each on average about 3.5 phenolic nuclei in length and having on average about 1.22 of the phenolic —OH groups thereof oxyalkylated by the alkylene oxide to provide alcoholic alkanol groups attached at phenoxy positions on said fragments, each of said fragments containing a substantial amount of free phenolic —OH groups and having unsubstituted reactive hydrogen on the phenolic nuclei; and (2) a saturated unbranched linear ester forming group containing a saturated unbranched dicarboxy acid, said ester forming group being stoichiometrically equal to not more than one mole of said ester forming group for every two moles of said alcoholic groups and having the carboxy groups thereof joining said alcoholic groups to link said fragments.

6. An esterification product according to claim 5 wherein the alkylene oxide is ethylene oxide and wherein the dicarboxy acid is selected from the group consisting of succinic, adipic, sebacic and azelaic acid.

7. An esterification product according to claim 6 wherein the ester forming group contains a saturated unbranched linear diol.

References Cited in the file of this patent

UNITED STATES PATENTS

| | | |
|---|---|---|
| 2,454,544 | Bock et al. | Nov. 23, 1948 |
| 2,541,999 | De Groote et al. | Feb. 20, 1951 |
| 2,610,955 | De Groote et al. | Sept. 16, 1952 |

OTHER REFERENCES

Martin: "The Chemistry of Phenolic Resins," published by Wiley & Sons, New York, 1956, pp. 117–159.